United States Patent
Margalit et al.

(10) Patent No.: US 6,931,174 B2
(45) Date of Patent: Aug. 16, 2005

(54) OPTICAL ADD/DROP MODULE

(75) Inventors: Near Margalit, Studio City, CA (US); Archer Shu, Hsinchu (TW); Pin-Sung Wang, Hsinchu (TW)

(73) Assignee: Luminent Incorporated, Chatsworth, CA (US)

( * ) Notice: Subject to any disclaimer, the term of this patent is extended or adjusted under 35 U.S.C. 154(b) by 246 days.

(21) Appl. No.: 10/230,961

(22) Filed: Aug. 29, 2002

(65) Prior Publication Data

US 2004/0042710 A1 Mar. 4, 2004

(51) Int. Cl.$^7$ ................................................. G02B 6/28
(52) U.S. Cl. ............................ 385/24; 385/89; 398/83; 398/85; 398/135; 398/138
(58) Field of Search ........................ 385/24, 37, 88–89, 385/92; 398/83, 85, 135, 138

(56) References Cited

U.S. PATENT DOCUMENTS

| | | |
|---|---|---|
| 3,857,092 A | 12/1974 | Meyer |
| 5,416,627 A | 5/1995 | Wilmoth |
| 5,534,876 A | 7/1996 | Erickson |
| 5,777,768 A | 7/1998 | Korevaar |
| 6,542,660 B1 * | 4/2003 | Medin et al. ............ 385/24 |

* cited by examiner

Primary Examiner—Frank G. Font
Assistant Examiner—Michael P. Mooney
(74) Attorney, Agent, or Firm—Nydegger & Associates

(57) ABSTRACT

A plug-in, optical add/drop (OAD) device includes a filter for adding and dropping a light beam of wavelength ($\lambda_k$) from a combined light beam having individual beams of different wavelengths ($\lambda_1 \ldots {}_n$). Several devices can be selectively integrated to create an optical communications system that will handle "n" different optical communications circuits. In operation, the devices are individually connected (plugged-in) to a GBIC, and they are serially connected (plugged-in) to each other. Consequently, immediately upstream from a device, the combined light beam includes wavelengths ($\lambda_1$ through $\lambda_n$). On the other hand, the combined light beam immediately downstream includes ($\lambda_1$ through $\lambda_{k-1}$ and $\lambda_{k+1}$ through $\lambda_n$).

17 Claims, 2 Drawing Sheets

OPTICAL ADD/DROP MODULE

FIELD OF THE INVENTION

The present invention pertains generally to optical communications systems. More specifically, the present invention pertains to optical communications systems that are capable of simultaneously handling a plurality of individual light beams of different wavelengths, on a common beam path, wherein each light beam creates a circuit that carries its own communications data. The present invention is particularly, but not exclusively, useful as an optical add/drop device that is dedicated for use with a light beam having a particular wavelength, wherein the device can be selectively integrated with other such devices on a common beam path in an optical communications system, on an "as needed" basis.

BACKGROUND OF THE INVENTION

In general, modern high-speed fiber optic communications systems are able to achieve high bandwidth by simultaneously transmitting data on multiple light beams of different wavelengths, over the same optical fiber. To do this, it is necessary for the light beams to be somehow combined (i.e. multiplexed) onto an optical fiber for transmission. Also, the reception of the data requires the different light beams be somehow separated (i.e. demultiplexed).

Presently, there are basically two different types of wavelength division multiplexing systems that are being used. These are: Coarse Wavelength Division Multiplexing (CWDM), and Dense Wavelength Division Multiplexing (DWDM). The main difference between these two types of systems is that DWDM can handle more channels of communications than can CWDM. A consequence of this, however, is that CWDM requires less wavelength control than does DWDM and, thus, can be less expensive. Regardless which type system is being used, each transmitted light beam originates at a laser source that is tuned to a predetermined wavelength. This light beam is then received at a detector that is dedicated to the predetermined wavelength. In practice, the tuned laser source and the detector are often combined in the same device. This device both modulates data onto the laser light beam, and demodulates the data from the detector. One such device which is useful for high-speed operation, and which is well known in the pertinent art, is a GigaBit Interface Converter (GBIC).

Heretofore, multiplexers and demultiplexers have been manufactured to handle a predetermined number of different wavelength light beams (e.g. sixteen) in a fiber optic communications system. Accordingly, a communications terminal in the system that is intended to service sixteen, or fewer, channels would require one multiplexer and one demultiplexer. The multiplexes are typically housed in a separate shelf that is dedicated for passive components. In this case, the multiplexer would be connected via patchcord cables directly to as many individual GBIC's as there are light beam communications channels being serviced by the system. Likewise the demultiplexer would be connected via patchcord cables directly to these same GBIC's. This would be the case, even though less than the potential sixteen channels are being used (e.g. only five light beam communication channels in use). In other words, only cables corresponding to existing GBICS (interfaces) are in place. Additional GBICS (interfaces) require additional cabling that will be most likely between the GBIC (interface) and a specific port of the modulator/demodulator.

In light of the above, it is an object of the present invention to provide a modular, stand-alone optical add/drop (OAD) device that can be used in a fiber optic communications system and plugs directly into an interface converter on the networking equipment to thereby eliminate exhaustive cabling, and reduce the possibility of miscabling. Another object of the present invention is to provide an OAD device that plugs into a GBIC for transmitting and receiving communications light beams having a predetermined wavelength. Yet another object of the present invention is to provide an OAD device that can be connected in series with other OAD devices to establish an "n" number of direct connections to a corresponding number of GBIC's. Another object of the present invention is to provide an OAD device that is relatively easy to manufacture, is easy to use, and is comparatively cost effective.

SUMMARY OF THE PREFERRED EMBODIMENTS

For the present invention, an optical add/drop (OAD) device is provided which can be selectively used in an optical communications system, on an "as needed" basis. In particular, an OAD device of the present invention is suited for use in optical communications systems that optically transmit and receive a plurality of different wavelength light beams on a common beam path as a combined light beam. More specifically, each OAD device of the present invention allows a light beam of particular wavelength ($\lambda_k$) to be added and dropped from a combined light beam. Importantly each OAD device is a so-called "pluggable" unit that can be selectively incorporated into a common system wherever a light beam of the particular wavelength ($\lambda_k$) is being used.

In accordance with the present invention, a combined light beam for use in a multiplexed transmission will include an (n)-number of individually identifiable light beams. Specifically, each of these light beams will have a particular wavelength $\lambda_k$ ($\lambda_k = \lambda_1 \ldots \lambda_n$). As intended for the present invention, each OAD device is designed for a specific wavelength $\lambda_k$. Accordingly, whenever it is desired that a combined light beam include an (n)-number of different wavelength light beams ($\lambda_1 \ldots \lambda_n$), a separate OAD device is required to transmit (add) or receive (drop) each light beam ($\lambda_k$) to and from the combined beam. Consequently, each OAD device effectively serves as a communications terminal for communications that are transmitted and received on a light beam having the wavelength $\lambda_k$. Importantly, the OAD device of the present invention is a stand-alone modular unit that can be easily plugged into, or disconnected from a GBIC or similar laser transceiver. Further, each OAD device can be plugged into other OAD devices to serially connect as many OAD devices as there are light beams of different wavelength in the combined light beam.

Structurally, an OAD device in accordance with the present invention includes a first adapter for receiving a combined light beam having a plurality of light beams of different wavelengths (e.g. $\lambda_1 \ldots \lambda_n$). In this combined light beam each light beam will have an individually identifiable wavelength ($\lambda_k = \lambda_1 \ldots \lambda_n$). The OAD device also includes a second adapter for transmitting and receiving all light beams having wavelengths other than the particular design wavelength ($\lambda_k$) of the OAD device. More specifically, the OAD device also includes a band-pass filter which passes light of substantially the wavelength ($\lambda_k$), but which reflects light of other wavelengths. Consequently, upstream from each OAD device, the combined light beam can include light beams of all wavelengths ($\lambda_1 \ldots \lambda_n$). On the other hand, downstream from the OAD device, the combined light beam will include only light beams of wavelengths other than $\lambda_k$, which was added and dropped by the OAD device.

It is an important aspect of the present invention that each OAD device can be individually connected with a GBIC, or some other similar laser/detector interface, and that each OAD device can be individually connected with both an upstream OAD device and a downstream OAD device. Preferably, these connections are made with plug-in connectors of a type well known in the pertinent art. Accordingly, for an optical communication system that incorporates OAD devices of the present invention, the system can be configured to use only as many OAD devices as are necessary for handling the individual light beams of the communications system. In addition, the OAD devices can be interconnected in arbitrary order, lessening the possibility of erroneous interconnections.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
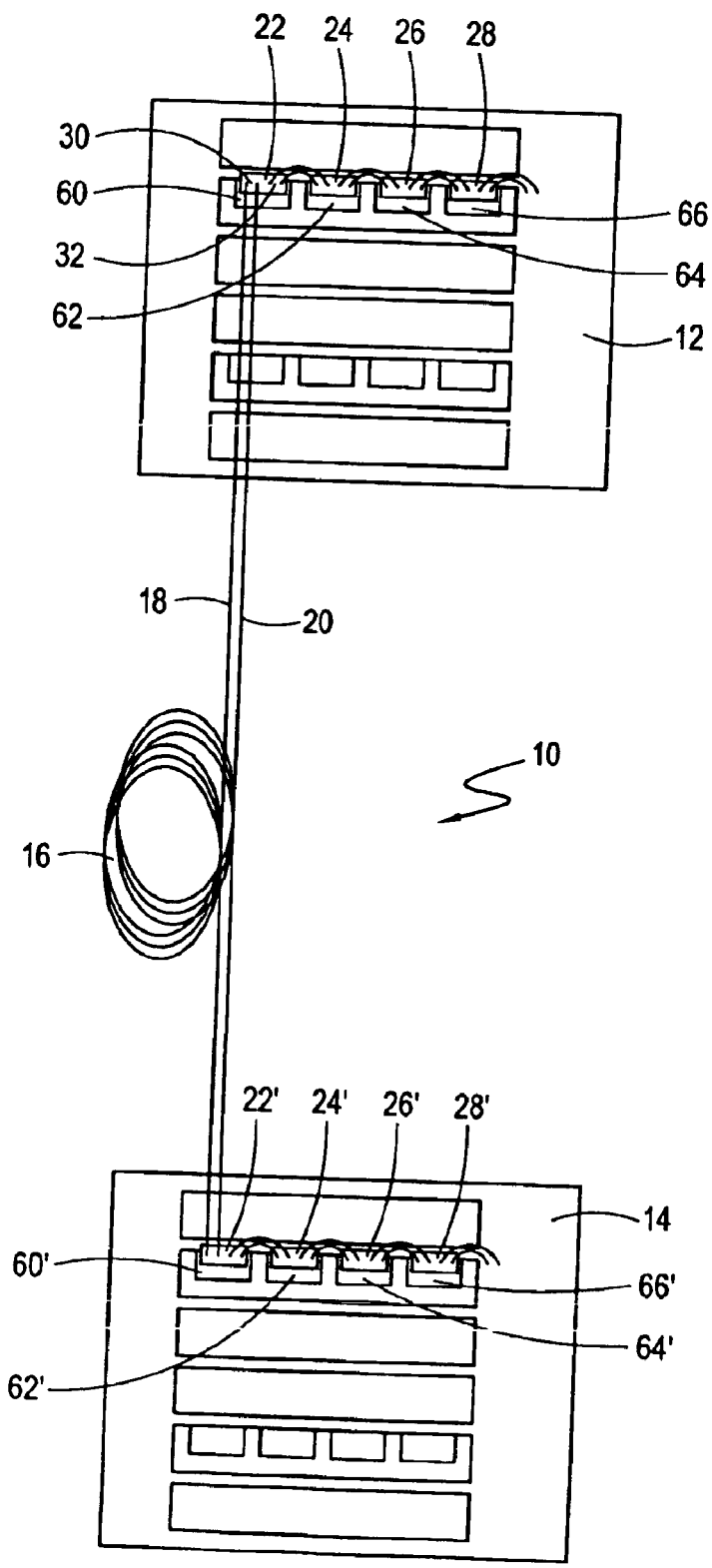
FIG. 1 is a schematic view of a high-speed fiber optic communications system incorporating optical add/drop devices in accordance with the present invention.

Referring initially to FIG. 1, a fiber optic communications system in accordance with the present invention is shown and is generally designated 10. As shown in FIG. 1, the system 10 includes a first terminal 12 and a second terminal 14 that are connected to each other by an optical link 16. This optical link 16 includes an optical fiber 18 for transmitting data from terminal 14 to terminal 12, and an optical fiber 20 for transmitting data from terminal 12 to terminal 14. Both optical fiber 18, and optical fiber 20, are of a type well known in the pertinent art that is suitable for the transmission of a combined light beam. As used herein, a combined light beam is one having an "n" number of light waves, each of which has a different individually identifiable wavelength (i.e. $\lambda_k$, where k=1 . . . n).

In FIG. 1, a plurality of optical add/drop (OAD) devices 22, 24, 26 and 28 are shown aligned in series on the terminal 12. For purposes of this disclosure, a downstream direction for the aligned OAD devices 22–28 is taken to be in the direction from OAD device 22 toward OAD device 28. FIG. 1 also shows similar OAD devices 22', 24', 26' and 28' aligned in series on the terminal 14. Within this configuration, because they are connected directly onto the optical link 16, the OAD devices 22 and 22' are respectively considered to be "lead" devices for the respective terminals 12 and 14. The details of each OAD device 22–28 is, perhaps, best appreciated by taking the OAD device 22 as an example.

Figure 2:
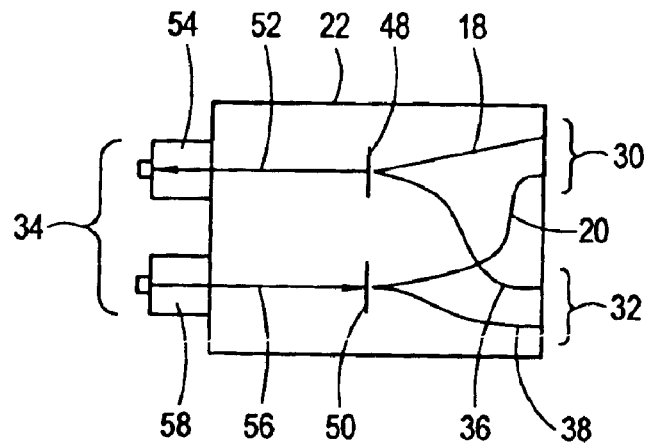
FIG. 2 is a schematic view of the internal circuitry of an optical add/drop device of the present invention.
Figure 3:
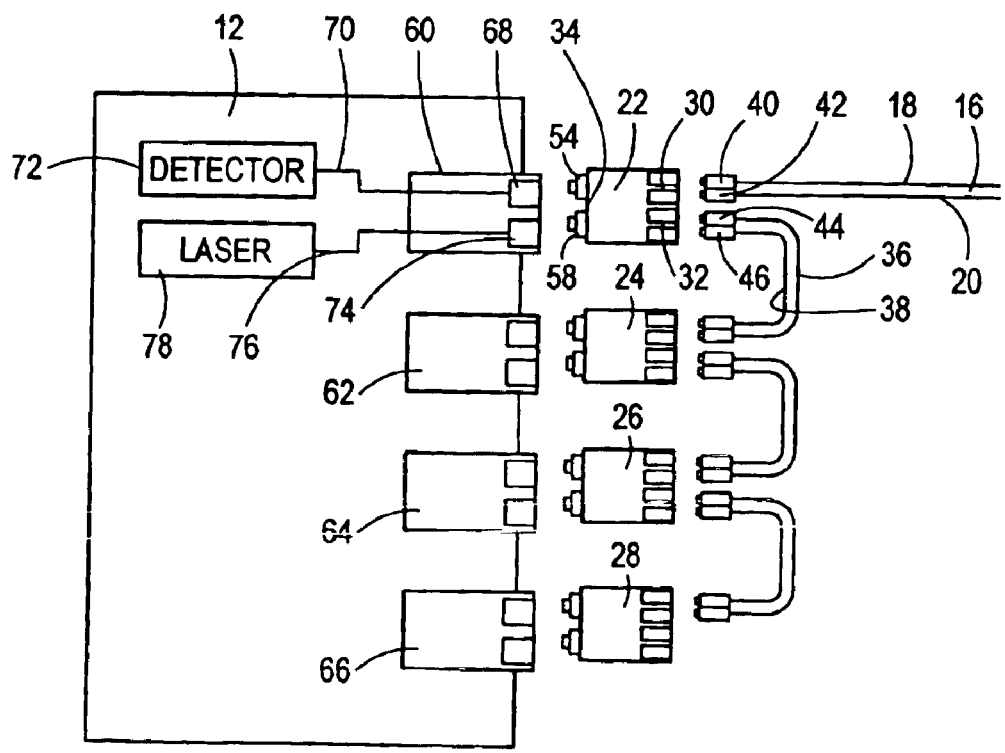
FIG. 3 is an exploded schematic view of the components for a fiber optic communications system that incorporates a preferred embodiment of the optical add/drop devices of the present invention.

Referring now to FIG. 2 it can be seen that the exemplary OAD device 22 includes a first adapter 30, a second adapter 32 and a third adapter 34. These adapters 30, 32, and 34 are arranged on the OAD device 22 substantially as shown. In FIG. 2, it will be seen that the optical fibers 18 and 20 from optical link 16 interconnect with the OAD device 22 via the first adapter 30. Also, FIG. 2 shows that the second adapter 32 of the OAD device 22 allows for an interconnection between the device 22 and optical fibers 36 and 38. Importantly, as shown in FIG. 3, the optical fibers 18 and 20 can be respectively connected to the first adapter 30 of OAD device 22 via plug-in connector prongs 40 and 42. Similarly, the optical fibers 36 and 38 can be respectively connected to the second adapter 32 of OAD device 22 via plug-in connector prongs 44 and 46. For purposes of the present invention, it is to be appreciated that the term "plug-in" is used in the sense that the respective components are somehow connectorized.

FIG. 2 also shows that the OAD device 22 includes a beam splitter 48 and a beam splitter 50. More specifically, the beam splitters 48 and 50 for the OAD device 22 are of a type, well known in the pertinent art, that is capable of passing a light beam of predetermined wavelength (e.g. $\lambda_k$) while reflecting light beams of substantially all other wavelengths. Also shown in FIG. 2 is a drop-line 52 that interconnects the beam splitter 48 with a plug-in connector prong 54. Further, there is an add-line 56 that interconnects the beam splitter 50 with a plug-in connector prong 58. Together, the plug-in prongs 56 and 58 comprise the third adapter 34 of OAD device 22. Again, in a more general sense, these components are connectorized.

At this point it is to be understood that the OAD devices 22, 24, 26 and 28 are all substantially similar, with one exception. This exception being; the respective beam splitters 48, 50 respond to light beams of different wavelengths $\lambda$. For example, in the system 10 shown in FIG. 1 there are four different OAD devices 22, 24, 26 and 28. Accordingly, "n" is equal to four. Going downstream in numerical order, the lead OAD device 22 is designed to add/drop light beams of wavelength $\lambda_1$, while OAD devices 24, 26 and 28 are designed to respectively add/drop light beams of wavelengths $\lambda_2$, $\lambda_3$, and $\lambda_4$. Thus, it is to be noted that the combined light beam being transmitted over optical link 16 will include the light beams of all the wavelengths: $\lambda_1$, $\lambda_2$, $\lambda_3$, and $\lambda_4$. As implied above, however, it should be recalled there may be more than four different wavelength light beams in the combined light beam. Stated differently, "n" merely equals the number of light beams (channels) being handled by the system 10, and therefore, "n" can be either less than or greater than the sixteen or other number of channels typically incorporated into commercially available multiplexers and demultiplexers. Regardless the actual value for "n", the wavelengths of the various light beams in the combined light beam will preferably be in a range of approximately 1300 to 1600 nanometers.

In both FIG. 1 and FIG. 3 it will be seen that each OAD device 22, 24, 26 and 28 is connected to a respective laser/detector interface 60, 62, 64 and 66. Preferably, the laser/detector interfaces 60, 62, 64 and 66 are GigaBit Interface Converters (GBIC) of a type well known in the pertinent art or any other similar type device known in the pertinent art, such as fiber transceivers. For purposes of disclosure, the interfaces 60, 62, 64 and 66 will hereinafter be respectively referred to, in general, as GBIC 60, 62, 64 and 66.

In FIG. 3, using GBIC 60 as an example, it is seen that the GBIC 60 includes a receptacle 68 that is optically connected, via line 70 with a detector 72. Also, the GBIC 60 includes a receptacle 74 that is optically connected, via line 76, with a laser source 78. Further, it is to be appreciated that the plug-in connector prong 54 of OAD device 22 is operationally insertable into the receptacle 68 of the GBIC 60. Likewise, the plug-in connector prong 58 of OAD device 22 is operationally insertable into the receptacle 74 of GBIC 60. Thus, the OAD device 22 can be easily "plugged" into the GBIC 60. Importantly, the interaction of OAD devices 24, 26 and 28, with respective GBIC's 62, 64 and 66, as well as their detectors (not shown) and laser sources (not shown), is substantially the same as described above for the OAD device 22 and GBIC 60.

In an alternate embodiment of the present invention, the plug-in prongs 44 and 46, for plugging optical fibers 36 and 38 into the second adapter 32 of OAD device 22 can be replaced by so-called "pigtailed" connections (e.g. connectorized). Regardless of the structure that is used, it is an important aspect of the present invention that the second adapter 32 of each OAD device be optically connected to the first adapter 30 of the immediately adjacent downstream OAD device. Preferably, the first adapters 30 of each OAD device will have a plug-in (connectorized) structure such as described above for first adapter 30 of OAD device 22.

OPERATION

In the operation of the system 10 of the present invention, an "n" number of OAD devices (e.g. devices 22, 24, 26 and 28) are selected. Specifically, the "n" number of devices are selected to correspond with the "n" number of light beams that are to be carried in a combined light beam over the optical link 16. Each OAD device (e.g. devices 22, 24, 26 and 28) can then be individually plugged into a respective GBIC (e.g. GBIC's 60, 62, 64 and 66 of corresponding color). Further, each of the OAD devices is then connected with the immediately adjacent downstream OAD device. As indicated above, this serial connection of OAD devices is accomplished by plug-ins between the second adapter 32 of the upstream OAD device (e.g. device 22), with the first adapter 30 of the downstream OAD device (e.g. device 24). Once the OAD devices (e.g. devices 22, 24, 26 and 28) have been interconnected with each other, and with the GBIC's 60, 62, 64 and 66, the optical link 16 is plugged into the first adapter 30 of the lead OAD device 22.

Insofar as a general description of the communications channels is concerned, consider that the combined light beam on optical link 16 includes an "n" number of different wavelength $\lambda_n$ (n=1 ... n). Also, in general, consider that each OAD device and associated GBIC is designed to handle a predetermined wavelength $\lambda_k$ ($\lambda_k=\lambda_1$ through $\lambda_n$). As indicated above, the number "n" will be determined by the number of different channels being used for the system 10. Here, for purposes of discussion, and as shown in the Figures, "n" is four. Accordingly, the combined light beam on optical link 16 will include light beams with wavelengths $\lambda_1$, $\lambda_2$, $\lambda_3$, and $\lambda_4$. Preferably, as previously stated, these wavelengths will be in a range between about 1300 nm and 1600 nm.

For the example being given here (i.e. four communications channels), when the combined light beam in optical fiber 18 of optical link 16 enters the first adapter 30 of OAD device 22, it will include the wavelengths $\lambda_1$, $\lambda_2$, $\lambda_3$, and $\lambda_4$. After being received by the OAD device 22, as shown in FIG. 2, these light beams are directed to the beam splitters 48. For the particular example being given, the beam splitters 48 and 50 of OAD device 22 are selected to pass light having a wavelength $\lambda_1$. Consequently, the light beam ($\lambda_1$) is passed via the drop line 52 and the line 70 to the detector 72 (see FIG. 3). Thus, the light beam ($\lambda_1$) is dropped from the combined light beam. On the other hand, the light beams of wavelengths $\lambda_2$, $\lambda_3$, and $\lambda_4$ are reflected by the beam splitter 48. These light beams of wavelengths $\lambda_2$, $\lambda_3$, and $\lambda_4$ now constitute a so-called intermediate light beam that is passed via optical fiber 36 through the second adapter 32 of OAD device 22 and to the first adapter 30 of OAD device 24. At the OAD device 24, a similar "drop" operation occurs for dropping the light beam of wavelength $\lambda_2$ from the intermediate beam. Similar "drop" operations are accomplished, in turn, by OAD devices 26 and 28.

A combined light beam, that is to be transmitted over the optical fiber 20 of optical link 16, is constituted by sequentially adding light beams of predetermined wavelength (e.g. $\lambda_k$). Specifically, a light beam of wavelength $\lambda_k$ is added at an OAD device to the light beams that are generated by downstream OAD devices (e.g. $\lambda_{k+1}$+ ... $\lambda_n$). Again consider the OAD device 22 while cross-referencing FIG. 2 and FIG. 3. In this case, the laser source 78 generates a light beam having a wavelength $\lambda_1$. This light beam is then modulated with data and is passed via line 76 (FIG. 3) and add-line 56 (FIG. 2) to the beam splitter 50. Recall, the beam splitter 50 will pass the light beam of wavelength $\lambda_1$. Thus, this light beam passes onto the optical fiber 20. Because beam splitter 50 reflects all other light beams, the light beams of wavelengths $\lambda_2$, $\lambda_3$, and $\lambda_4$ that come to beam splitter 50 via optical fiber 38 from the downstream OAD devices 24, 26 and 28 are also directed onto the optical fiber 20. Thus, $\lambda_1$ is "added" to $\lambda_2$, $\lambda_3$, and $\lambda_4$ for transmission therewith as a combined light beam on the optical link 16.

An important aspect of the present invention is that each OAD device 22, 24, 26 and 28 can be plugged in to a respective GBIC 60, 62, 64 and 66 on an "as-needed" basis. Further, the OAD devices (e.g. 22, 24, 26, 28, etc.) can be plugged into each other, in a serial alignment, to concertedly handle a corresponding "n" number of different wavelength light communications channels.

While the particular Optical Add/Drop Module as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An optical add/drop (OAD) device, connectable with a GBIC, for use in transmitting a light beam having a wavelength and for receiving a light beam having the same wavelength, said device comprising:

a first adapter for transmitting and receiving a combined light beam, wherein the combined light beam includes an (n)-number of light beams, wherein each light beam has an identifiable wavelength $\lambda_k$ ($\lambda_k=\lambda_1$ ... $\lambda_n$);

a second adapter for transmitting and receiving an intermediate light beam having light beams with wavelengths ($\lambda_1$ through $\lambda_{k-1}$ and $\lambda_{k+1}$ through $\lambda_n$);

a means for adding a light beam having the wavelength $\lambda k$ to an intermediate light beam for transmission as a combined light beam from said first adapter;

a means for dropping a light beam having the wavelength $\lambda_k$ from a combined light beam, as received by said first adapter, for direction of the light beam having the wavelength $\lambda_k$ to a detector, and for transmission of an intermediate light beam having wavelengths $\lambda_{k+1}$ through $\lambda_n$ from said second adapter, as an intermediate light beam; and a third adapter for plugging said CAD device directly into the GBIC.

2. A device as recited in claim 1 further comprising:

a laser source for generating the light beam having a wavelength $\lambda_k$; and a detector for receiving the light beam having a wavelength $\lambda_k$.

3. A device as recited in claim 1 further comprising an optical link for carrying said combined light beam.

4. A device as recited in claim 3 wherein said optical link comprises:

a first optical fiber for transmitting a combined light beam to said device; and a second optical fiber for receiving a combined light beam from said device.

5. A device as recited in claim 4 wherein said device is a lead device in combination with an (n−1)-number of additional devices serially connected to each other and to said lead device in a downstream alignment from said lead device with a respective said first adapter connected to said second adapter of said adjacent upstream device.

6. A device as recited in claim 4 wherein said means for adding a light beam, and said means for dropping a light beam, are beam splitters which pass light beams having a wavelength $\lambda_k$, and substantially reflect all other light beams.

7. An optical data communications system which comprises:

an optical link for carrying an (n)-number of individually identifiable light beams $\lambda_k$ ($\lambda_k = \lambda_1 \ldots \lambda_n$);

an (n)-number of optical add/drop (OAD) devices, wherein each said OAD device includes a first adapter, a second adapter, and a third adapter, and wherein one said OAD device is a lead device with said first adapter thereof connected to said optical link;

an (n−1)-number of means for serially connecting said (n)-number of devices to each other in a downstream alignment from said lead device, with a respective said second adapter connected to said first adapter of said adjacent downstream device; and an (n)-number of laser transceiver means, wherein each said laser transceiver means is plugged into said third adapter of a respective said CAD device to interconnect transceiver means to said first adapter, through a respective said third adapter, for adding a light beam having a wavelength $\lambda_k$ to said optical link, and for dropping a light beam having a wavelength $\lambda_k$ from said optical link.

8. A system as recited in claim 7 wherein said optical link comprises:

a first optical fiber for transmitting an (n)-number of light beams to said lead device; and a second optical fiber for receiving an (n)-number of light beams from said lead device.

9. A system as recited in claim 7 wherein each said laser transceiver means comprises:

a laser source for generating a light beam having a wavelength ($\lambda_k$); and a detector for receiving a light beam having the wavelength ($\lambda_k$).

10. A system as recited in claim 7 wherein said connecting means is an optical fiber.

11. A system as recited in claim 7 wherein said means for serially connecting a respective said first adapter to a respective said second adapter is an optical plug, and wherein said third adapter is an optical plug.

12. A system as recited in claim 7 wherein said laser means for adding a light beam and for dropping a light beam, is a pair of beam splitters for passing light beams having a wavelength $\lambda_k$, and for substantially reflecting all other light beams.

13. A system as recited in claim 7 wherein said first adapter, said second adapter and said third adapter are connectorized.

14. A method for adding and dropping a light beam having an identifiable wavelength $\lambda_k$ ($\lambda_k = \lambda_1 \ldots \lambda_n$) from a combined light beam having an (n)-number of light beams, wherein "n" is greater than sixteen, the method comprising the steps of:

providing an (n)-number of optical add/drop (OAD) devices, wherein each OAD device includes a first adapter, a second adapter, and a third adapter, and wherein one OAD device is a lead device with the first adapter thereof connected to an optical link;

serially connecting the (n)-number of devices to each other in a downstream alignment from the lead device, with a respective first adapter connected to the second adapter of the adjacent upstream device; and plugging an (n)-number of laser transceiver means into the third adapter of respective OAD devices, to interconnect each transceiver means to a respective said first adapter, through said third adapter, for adding a light beam having a wavelength $\lambda_k$ to said optical link, and for dropping a light beam having a wavelength $\lambda_k$ from said optical link.

15. A method as recited in claim 14 wherein the laser transceiver means includes a laser source and a detector, and the method further comprises the steps of: plugging the laser source and the detector into the third adapter; and plugging the optical link into the first adapter of the lead device for transmitting and receiving the combined light beam.

16. A method as recited in claim 15 wherein the serially connecting step is accomplished by the steps of:

providing an optical fiber; and plugging the optical fiber into the first adapter of a downstream OAD device.

17. A method as recited in claim 14 wherein the laser transceiver means for adding a light beam and for dropping a light beam includes a pair of beam splitters which pass light beams having a wavelength $\lambda_k$, and substantially reflect all other light beams.

* * * * *

UNITED STATES PATENT AND TRADEMARK OFFICE
CERTIFICATE OF CORRECTION

PATENT NO. : 6,931,174 B2
DATED : August 16, 2005
INVENTOR(S) : Margalit et al.

It is certified that error appears in the above-identified patent and that said Letters Patent is hereby corrected as shown below:

Column 6,
Line 48, delete "transmilling" insert -- transmitting --.
Line 58, delete "λk" insert -- $\lambda_k$ --.

Column 7,
Lines 1 and 44, delete "CAD" insert -- OAD --.

Signed and Sealed this

Twenty-fifth Day of October, 2005

JON W. DUDAS
*Director of the United States Patent and Trademark Office*